United States Patent [19]

Wendling

[11] Patent Number: 5,304,012
[45] Date of Patent: Apr. 19, 1994

[54] DRIVE SHAFT FITTING OR COUPLING
[75] Inventor: Eric Wendling, Verona, N.J.
[73] Assignee: Curtiss Wright Flight Systems Inc., Fairfield, N.J.
[21] Appl. No.: 906,400
[22] Filed: Jul. 1, 1992
[51] Int. Cl.⁵ .............................................. B23P 11/00
[52] U.S. Cl. ...................................... 403/274; 403/359
[58] Field of Search ................ 403/359, 284, 285, 274
[56] References Cited

U.S. PATENT DOCUMENTS

| | | | |
|---|---|---|---|
| 3,279,835 | 10/1966 | Krohm | 403/359 X |
| 3,425,719 | 2/1969 | Burton. | |
| 4,257,155 | 3/1981 | Hunter. | |
| 4,513,488 | 4/1985 | Arena. | |
| 4,523,872 | 6/1985 | Arena et al. | |
| 4,561,799 | 12/1985 | Arena. | |
| 4,597,687 | 7/1986 | Colas. | |
| 4,807,351 | 2/1989 | Berg et al. | |
| 4,850,621 | 7/1989 | Umehara. | |
| 4,950,101 | 8/1990 | Artzberger. | |

Primary Examiner—Randolph A. Reese
Assistant Examiner—Christopher J. Novosad
Attorney, Agent, or Firm—Klauber & Jackson

[57] ABSTRACT

A drive shaft fitting or coupling having multiple symmetrically disposed spaced apart splines. The splines are configured with substantially flat perpendicular lateral surfaces, with defined upper corners, and the spacings between adjacent splines have radiused bases terminating in defined lower corners at the point of intersection with the lateral surfaces of the splines. The corners of the splines retard slippage and the radiused bases provide load distribution thereby reducing the stress imposed on the tubing at the interface between the coupling. In a specific embodiment, a circumferential recess is additionally formed in the fitting or coupling adjacent the inner ends of the splines to provide axial retention. In the coupling embodiment, one end is formed with exposed radially extending splines and spacings for engagement with a drive shaft and the other end is formed with an appropriate geometry for connection with other fittings and drive line components.

7 Claims, 1 Drawing Sheet

DRIVE SHAFT FITTING OR COUPLING

This invention relates to fittings or couplings for drive shafts and particularly to spline and swage connected fittings and drive shafts.

In order to connect drive shafts, having circular cross section, to other elements such as fittings, couplings ("couplings" will be hereinafter generally included in the overall term of "fittings"), other drive shafts, and the like, it has been necessary to provide an interconnection with tubular elements which are capable of transmitting the drive torque. A common means of interconnection in this manner is the swaged connection of the end of a drive shaft with a fitting having matingly keyed elements, with a primary example of such keyed elements being a splined interconnection. In this form of interconnection, the splines formed in one member of the interconnection, are usually of rectangular or trapezoidal cross-section, and are interfitted with mating recesses in the other member.

If the splines and mating recesses are formed separately, close tolerances are required to ensure proper mating, particularly under conditions of high torque, to avoid slippage and failure. Alternatively, one member is pre-formed with the splines and the other member is mated thereto, in situ by methods such as mechanical swaging or more preferably with a simultaneous uniformed force applied over the entire 360° of the fitting, (i.e. very high electromagnetic induced forces, commonly referred to as magneforming). In this latter manner of formation there are problems with the relaxation of the metal being swaged (sometimes referred to as spring back) and/or disruption of the perfect mating between the parts in the interconnection. Accordingly, in the past, variations in the shape of the spline cross-section have been suggested to obviate problems engendered by incomplete mating.

However, the geometry of the splines, spacings and mating configurations, though non-rectangular or trapezoidal in cross-section, have generally, in the past, been of uniform type. Thus, if the spline has a rectangular or trapezoidal cross section, the spacing between splines and the mating configuration are of either the same or mirror image configuration. Similarly if the cross section of the splines is of sinusoidal crests, the spacings are of the sinusoidal troughs and the mating sections are of sinusoidal crests as well, e.g. U.S. Pat. No. 4,807,351 issued to Berg et al. Variations and non-uniform cross sections have been avoided because of their possible asymmetrical centripetal effect on torque of the drive shaft. In addition, to maintain symmetry, it has generally been the practice to provide interconnections with an even number of splines.

The spline interconnections of the prior art, as well as the spacings and mating elements have been susceptible to various operational problems. These problems include slippage, with sinusoidal or completely curved interfaces, and high stress concentrations with imperfect flat mating elements.

It is an object of the present invention to provide a spline interconnection for drive shaft fittings or couplings having improved characteristics of non-slippage and reduction in the stress concentrations imposed on the mating tube.

It is a further object of the present invention to provide such improvement in splined interconnections effected by swaging.

These and other features and advantages of the present invention will become more evident from the following discussion as well as the drawings in which:

FIG. 4 is a cross section taken along line 4a-4a of FIG. 3a;

FIG. 4b is an enlarged view of the upper left hand quadrant section taken along line 4b—4b in FIG. 3a;

Generally the present invention comprises a tubular fitting for a drive shaft, with the fitting having multiple longitudinal, and preferably symmetrically disposed, spaced apart splines. The splines may extend radially inward from the inner surface of the tube or more preferably, to allow swaged interconnection with a hollow drive shaft, may extend radially outward from the outer surface of the tube. The splines are configured with substantially flat perpendicular lateral surfaces, with defined upper corners. The spacings, between adjacent splines, have radiused bases terminating in defined lower corners at the point of intersection with the lateral surfaces of the splines. The flat perpendicular lateral surfaces and the defined corners of the splines, retard slippage. The radiused bases provide non-sliding interfaces to distribute the load induced at the joint. In a preferred embodiment, a circumferential recess is formed in the fitting or coupling adjacent the inner ends of the splines to provide axial retention. In a coupling embodiment, one end of the coupling is formed with exposed radially extending splines and spacings for engagement with a drive shaft and the other end is formed with an appropriate geometry for connection with other fittings and drive line components. It is preferred that the interconnections between a drive shaft and the fitting or coupling be effected by very high electromagnetic induced forces or magneformed joints. The geometry of the splined connection of the present invention compensates for the problems encountered with such joint formation in the past.

Contrary to accepted practice it is preferred that there be an odd rather than even number of spacings. Other factors involved in formation of the fitting or coupling include a ratio between the fitting diameter and the number of spacings. In addition, the width and curvature of the radiused bases of the spacings is related to the couplings diameter. It is also desired to maintain a ratio between the mating tubings wall thickness and the perpendicular lateral surfaces of the coupling.

Figure 1A:
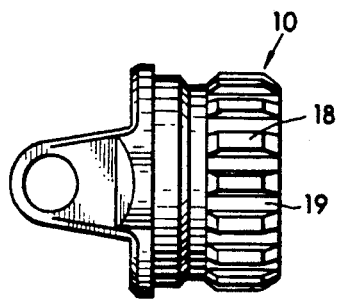
FIGS. 1a and 1b are side and end views of a splined fitting of the prior art with splines of trapezoidal cross-section.
Figure 1B:
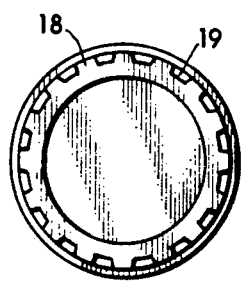
Figure 3A:
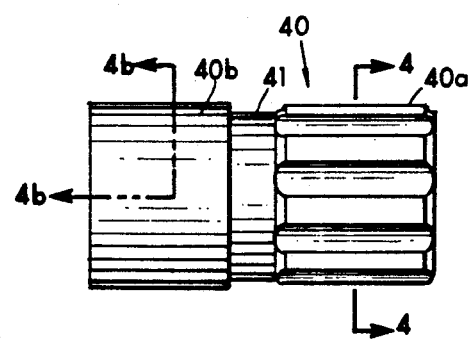
FIGS. 3a and 3b are side and isometric views of a coupling member having the spline configuration of the present invention.

With specific reference to the drawings, FIGS. 1a and 1b depict a typical prior art splined fitting 10 with trapezoidal cross-sectioned splines 18 and obversely shaped trapezoidal spacings 19. The base of the spacings 19 is substantially flat. These fittings 10 are susceptible to incomplete engagement with the co-fitting tubing and induce high stress concentrations on said tubing.

Figure 2A:
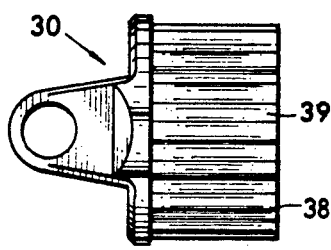
FIGS. 2a and 2b are side and end views of a splined fitting of the prior art with splines of sinusoidal cross section.
Figure 2B:
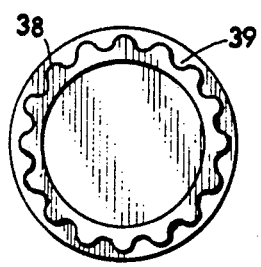
Figure 3B:
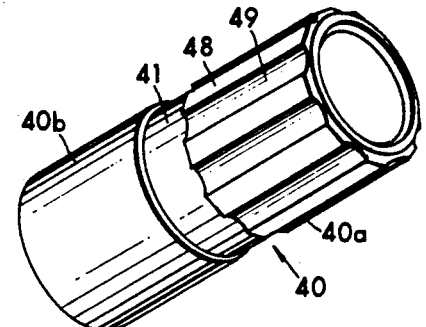

The prior art splined fitting 30 shown in FIGS. 2a and 2b obviates the problems of a stress concentration by conforming the splines 38 and spacing 39 into the formation of a smooth sinusoidal curve. However, because of such complete curvature and the lack of stop edges, such fittings are highly susceptible to slippage, particularly at high torque.

Figure 4:
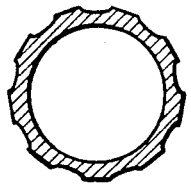
Figure 4A:
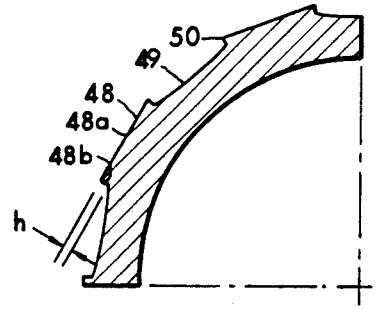
FIG. 4a is an enlarged view of the upper left hand quadrant of the cross section view of FIG. 4.
Figure 4B:
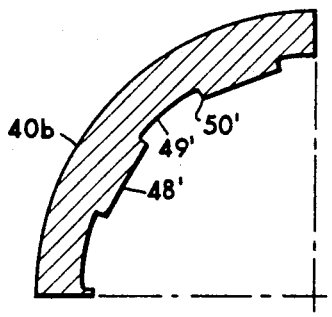

The splined fitting 40 of the present invention shown in FIGS. 3a–5, in the form of a coupling, has splines 48 with spacings 49 with such splines and spacings configured, as shown in FIG. 4 and more clearly in FIG. 4a. Each spline 48 is comprised of flat or circumferential surfaces, i.e. flat exposed surface 48a and shallow flat sides 48b. The splines 48 therefore have a small height h, sufficient to provide stop corners 50, which effectively retards slippage at high torque. Spacings 49 are gently radiused from the level of the splines 48 whereby an interface between the base of spacing 49 and a drive shaft such 60, as in FIG. 5, conformed thereto, is not planar. As a result of such non-planar interface, between conformed element 69 of the drive shaft 60 and the base of spacing 49, shifting under torque is substantially retarded with concomitant reduction in the local stresses. In FIG. 4b, internally splined section 40b of fitting 40 is adapted for engagement with a mating exteriorly splined drive shaft 60' as shown in phantom in FIG. 5. The internally extending splined structure of section 40b has radiused section 49' and flats 48' corresponding to radiused sections 49 and 48 respectively of the externally extending section 40a.

Figure 5:
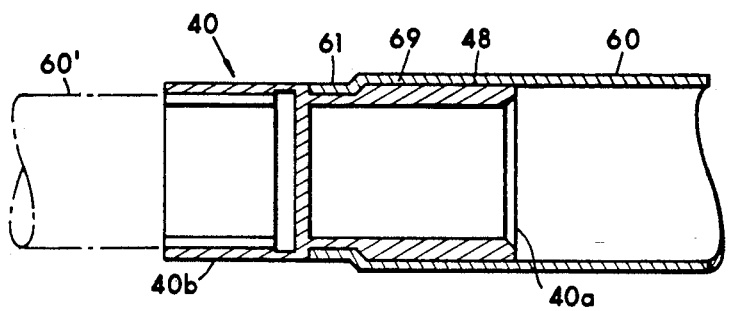
FIG. 5 is a cross section view of the coupling of FIG. 3a shown connected to a hollow drive shaft.

In the formation of the interconnection between drive shaft 60 and section 40a of coupling 40, as shown in FIG. 5, the end 61 of the hollow drive shaft 60 is positioned over circumferential groove 41. The end 61 of the drive shaft 60 with mating portion 69 is thereafter subjected to magneformed swaging by the application of short bursts of very high electromagnetic induced forces. The end 61 is thereby swaged into conformity with circumferential groove 41 and mating portion 69 is swaged into conformity with splines 48 and spacings 49 to effect the joint.

It is understood that the above description and drawings exemplify the present invention and that details contained therein are not to be construed as limitations on the present invention. Changes may be made such as in the geometry, dimensions and interrelations of elements without departing from the scope of the present invention as defined in the following claims.

What is claimed is:

1. A metal tubular fitting for a drive shaft, with the fitting being capable of transmitting high drive torque and having multiple longitudinally disposed, spaced apart splines radially extending from a surface of said tubular fitting; each of said splines being configured with substantially flat lateral surfaces, substantially perpendicular to said surface of the tubular fitting; and wherein spacings, between adjacent splines, have radiused bases into said surface terminating in defined lower corners at the point of intersection with the lateral surfaces of the adjacent splines, said splines being adapted to engage mating sections of the drive shaft to effect said transmission of high drive torque between the fitting and the drive shaft.

2. The tubular fitting of claim 1, wherein said surface is the outer surface of the tubular fitting and wherein said splines extend radially outwardly.

3. The tubular fitting of claim 2, wherein a circumferential recess is formed in the fitting at a position adjacent ends of the splines, distal to an end of the fitting which is engaged with said drive shaft, with said circumferential recess being adapted to be mated with a portion of said drive shaft swaged into conformity therewith.

4. The tubular fitting of claim 3, wherein said drive shaft is swaged into conformity with said circumferential recess and with said splines by magneforming.

5. The tubular fitting of claim 1, wherein said surface is the inner surface of the tubular fitting and wherein said splines extend radially inwardly.

6. The tubular fitting of claim 1, wherein one end of said tubular fitting comprises outwardly radially extending splines and spacings, for engagement with a drive shaft, and another comprises inwardly radially extending splines, for engagement with another fitting or drive shaft.

7. The tubular fitting of claim 1, wherein the number of splines is an odd number.

* * * * *